Jan. 12, 1943.　　　　S. EVANS　　　　2,308,066

TOOL JOINT ASSEMBLY

Filed Nov. 15, 1940

Seth Evans INVENTOR.

BY Jesse R. Stone

ATTORNEY

Patented Jan. 12, 1943

2,308,066

UNITED STATES PATENT OFFICE 2,308,066

TOOL JOINT ASSEMBLY

Seth Evans, Houston, Tex., assignor to Hughes Tool Company, Houston, Tex., a corporation of Delaware Application November 15, 1940, Serial No. 365,733

4 Claims. (Cl. 285—146)

My invention relates to tool joints such as are employed upon drill stems in well drilling.

The invention has particular application to the connection between the tool joint member and the end of the drill pipe section which is connected therewith.

In the use of a drill stem in rotating the well drill the joint is subjected to a material amount of lateral flexing or bending of the drill stem, due to the fact that the well bore is not always straight but is usually crooked, and also because of the vibration of the drill stem, resulting from weights imposed thereon. In use therefore the fatigue strain exerted upon the joints tends to cause failure and cracking of the drill stem at points adjacent the last engaged thread between the pipe and the box of the tool joint. When the pipe is screwed tightly into the joint to make a secure connection, due to the fact that the joint is tapered a strain develops which is in the nature of a compressive strain of the box against the threaded end of the pipe. This strain terminates at the last engaged thread and at this point the pipe is most likely to failure.

It is an object of the invention to provide a support between the pipe and the end of the tool joint box which will be under pressure and tend to take the strain developed in the bending of the pipe away from the threaded portion of the connection.

It is an object of the invention to provide a tapered bearing between the joint and the pipe end which will be forced into tight sealing contact when the pipe is screwed into the tool joint, thus not only taking up the compressive strain of the box against the pipe but also preventing leakage around the joint during the operation of the drill.

I desire to so form this bearing shoulder between the pipe and the joint that it may be easily and inexpensively applied and serve to economize in the construction of an efficient connection between the two members.

Figure 1:
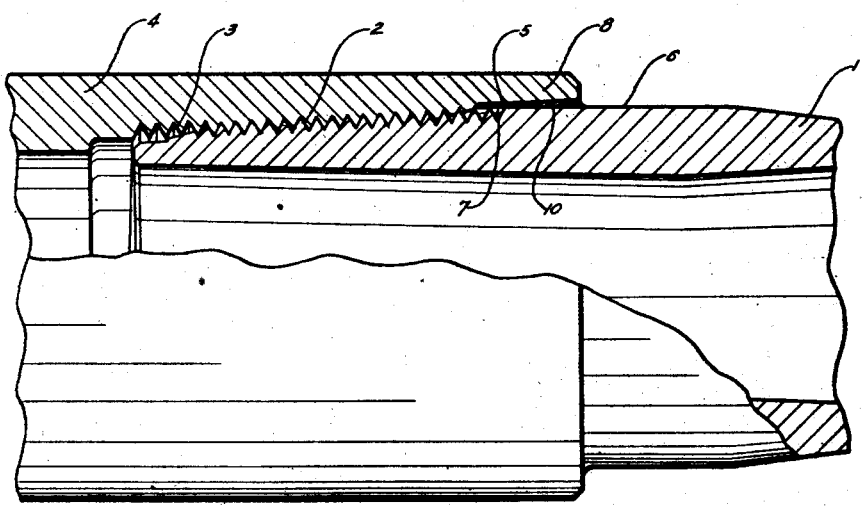

In the drawing herewith Fig. 1 is a side view partly in central longitudinal section illustrating the threaded connection between a tool joint member and the end of a section of drill stem.

Figure 2:
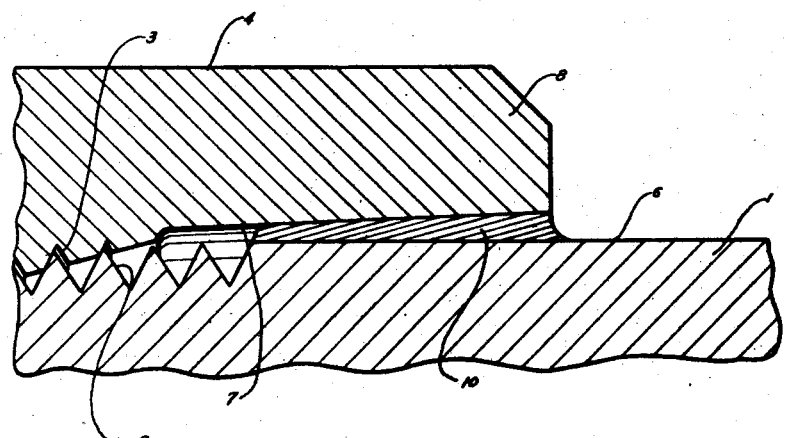

Fig. 2 is an enlarged and broken detail showing the construction of the bearing shoulder which forms the subject matter of the invention.

Referring to Fig. 1, I have shown the broken end of a pipe section 1 which may be both internally and externally upset, as shown, or of any desired construction now in common use. The end of the pipe section is tapered and threaded at 2 for engagement with the threaded end 3 of the tool joint member 4. The threaded portion 2 of the pipe terminates at 5 beyond which the area 6 of the pipe section is smooth and approximately cylindrical. The box member 4 has a smooth area 7, which extends beyond the threaded portion of the box, so as to overlie a portion of the cylindrical area 6 of the pipe. The threads upon the joint member extend inwardly a distance sufficient to allow the tight screwing up of the joint without the formation of a shouldered contact between the pipe end and the tool joint.

Various expedients have been employed to obtain a tight sealing and supporting engagement between the end 8 of the tool joint member and the pipe section. I have accomplished this object by depositing upon the pipe at a point where it will contact with the tool joint, when the joint is screwed up, a layer 10 of metal different from that of the pipe. This metal is preferably deposited upon the pipe by means of spraying the molten metal of the layer in position over the area to be covered. However, this metal may be positioned by other means such as welding, if desired. In placing this layer in position the outer surface of the pipe is cleaned and may, if desired, be roughened somewhat by knurling or otherwise, so as to form a surface area on which the sprayed metal will firmly attach itself. When the surface on the pipe has been thus cleaned the metal is sprayed thereon to the desired thickness and when cooled may then be machined to a smooth and tapered outer circumference which will be of sufficient thickness to engage with the inner tapered surface of the tool joint box.

The metal which is thus sprayed in position is preferably a non-galling metal and may be of bronze, cadmium, zinc or the like.

When the pipe has been thus treated and the layer 10 machined as desired the pipe is complete and ready for use. When the threaded connection has been made the pipe end will be forced tightly by screwing into the end of the tool joint member, bringing the inner surface 7 of the tool joint member tightly against the added metal 10.

The shoulder formed by the metal 10 thus tightly engages the inner surface of the pipe and is under a compressive strain similar to the strain upon the threads of the connection and in this manner protects the threads from lateral strains or stresses which may develop in the operation of the drill stem. Due to the fact that this metal on the shoulder is of different composition from that of the pipe or the tool joint the usual tendency of the metals to gall where rotated into tight engagement will be largely avoided. No galling will take place along this area and due to the close contact between the metals a seal will be formed which will prevent leakage around the joint.

The advantages of this construction lie in the fact that the non-galling shoulder between the pipe and the joint is easily and quickly applied and with only a slight expense. Furthermore, it will be apparent that if damage occurs to the surface between the two members during operations in the field a new deposit of metal may be made upon this surface with very little additional expense, thus making it possible to have a supporting shoulder at this point preventing lateral fatigue strains upon the last engaged thread and also sealing the joint against leakage.

The further advantages of this construction will be apparent to those skilled in the art.

What is claimed is:

1. In a tool joint, a box having a tapered and threaded socket and projecting smooth inner surface adjacent the end thereof, a pipe end threaded to engage within said box, a layer of gall-resisting metal fixed integrally upon said pipe end and opposed to the smooth surface of said socket, said layer of metal being of larger external diameter than said pipe end and adapted to be put under external wedging pressure as said pipe end is screwed into said socket.

2. A tool joint member, an inwardly tapered threaded box portion on said member, a pipe section threaded at its end to engage in said box, an unthreaded area on said pipe adjacent the threaded end, an internally smooth and inwardly tapered area on said box member adapted to overlie said unthreaded area on said pipe end, and a smoothly tapered shoulder of softer metal than said pipe integrally secured upon said last mentioned unthreaded area adapted to contact with the internally smooth portion of said box when it is screwed up and form a tight supporting engagement therewith.

3. In a tool joint, a tapered and threaded box, an internal inwardly tapered, smooth sealing area adjacent the end thereof extending beyond the threaded portion of the box, a pipe end tapered and threaded to engage within said box, said pipe having a smooth sealing area opposite the said smooth sealing area on said box, a shoulder formed integrally upon one of said smooth areas and tapered to engage the smooth opposed surface of the opposing member and have a wedging fit therewith when said joint is screwed up, said shoulder being of different metal from that of said pipe or said box.

4. A threaded connection between a tool joint and the end of a pipe section, comprising a tapered threaded socket on said tool joint, an internal smoothly tapered area adjacent the threaded portion at the end of said box, a threaded and tapered end on said pipe to engage in said socket, a smooth cylindrical area on said pipe adjacent said threaded portion, and a tapered annular ridge of non-galling metal secured integrally upon said cylindrical area and engaging said smoothly tapered area upon said socket and acting to place said socket under an expanding strain when said socket is tightly screwed up, thus protecting said threaded area upon said pipe from strain.

SETH EVANS.